United States Patent [19]

Wötting et al.

[11] Patent Number: 5,362,691
[45] Date of Patent: Nov. 8, 1994

[54] SINTERED MATERIAL BASED ON $Si_3N_4$ AND PROCESSES FOR ITS PRODUCTION

[75] Inventors: Gerhard Wötting, Coburg; Gerhard Leimer; Lutz Frassek, both of Roedental, all of Germany

[73] Assignee: Bayer Aktiengesellschaft, Leverkusen, Germany

[21] Appl. No.: 995,328

[22] Filed: Dec. 23, 1992

Related U.S. Application Data

[62] Division of Ser. No. 793,468, Nov. 18, 1991, abandoned.

[30] Foreign Application Priority Data

Nov. 29, 1990 [DE] Germany .................... 4038003

[51] Int. Cl.$^5$ ............................ C04B 35/58
[52] U.S. Cl. .......................... 501/97; 501/96; 501/98; 501/154; 423/344; 264/63; 264/65; 264/299; 264/DIG. 64
[58] Field of Search ............ 501/96, 97, 98; 423/344; 264/63, 65, 66, 299, 309, 334, DIG. 64, DIG 65, DIG. 72

[56] References Cited

U.S. PATENT DOCUMENTS

| | | | |
|---|---|---|---|
| 3,836,374 | 9/1974 | Richerson et al. | 501/96 |
| 4,004,937 | 1/1977 | Masaki | 501/96 |
| 4,264,547 | 4/1981 | de Pous | 264/65 |
| 4,351,787 | 9/1982 | Martinengo et al. | 264/65 |
| 4,354,990 | 10/1982 | Martinengo et al. | 264/65 |
| 4,511,525 | 4/1985 | Tsuge et al. | 501/97 |
| 4,628,039 | 12/1986 | Mizutani et al. | 501/97 |
| 4,652,276 | 3/1987 | Burden | 51/308 |
| 4,702,869 | 10/1987 | Higuchi et al. | 264/65 |
| 4,764,490 | 8/1988 | Yamakawa et al. | 501/97 |
| 4,777,822 | 10/1988 | Uemura et al. | 72/366 |
| 4,855,262 | 8/1989 | Richon et al. | 501/92 |
| 4,888,310 | 12/1989 | Richon et al. | 501/92 |
| 4,892,848 | 1/1990 | Yoshida et al. | 264/65 |
| 4,943,401 | 7/1990 | Edler et al. | 501/97 |
| 4,971,740 | 11/1990 | Nishio et al. | 264/63 |
| 5,017,531 | 5/1991 | Ukai et al. | 501/98 |

FOREIGN PATENT DOCUMENTS

| | | |
|---|---|---|
| 0080711 | 6/1983 | European Pat. Off. |
| 8401372 | 4/1984 | European Pat. Off. ........ 501/97 |
| 1301083 | 7/1974 | United Kingdom . |
| 1406571 | 9/1975 | United Kingdom . |

OTHER PUBLICATIONS

Quinn, G., J. Am. Ceram. Soc. 73:2374, 2383–84 (1990) no month.
Derwent Database, WPI Week 8043, J 55116671, Feb. 1979.

*Primary Examiner*—Mark L. Bell
*Assistant Examiner*—Michael Marcheschi

[57] ABSTRACT

$Si_3N_4$-based sintered compositions containing MgO and optionally other sintering additives, which after sintering, has a flexural strength level at room temperatures of $\geq 800$ MPa, measured by the four-point bending method, and a Weibull modulus of $>15$, is produced by mixing MgO, any additional sintering additives and $Si_3N_4$ powder to form a mixture, calcining the mixture in an oxygen-free atmosphere to obtain a pre-synthesis mixture, and adding the pre-synthesis mixture to uncalcined $Si_3N_4$ powder which is then sintered.

10 Claims, No Drawings

SINTERED MATERIAL BASED ON SI3N4 AND PROCESSES FOR ITS PRODUCTION

This application is a division, of application Ser. No. 07/793,468 filed on Nov. 18, 1991, now abandoned.

This invention relates to an $Si_3N_4$-based sintered material containing MgO and, optionally, other sintering additives and to processes for the production of this sintered material

BACKGROUND OF THE INVENTION

The production of dense $Si_3N_4$ materials (with densities of $\geq 96\%$ of the theoretical density) requires the addition of suitable additives which contribute towards the formation of a liquid phase during the heat treatment to compact the powder molding (sintering under atmospheric or elevated gas pressure, hot pressing, hot isostatic pressing) and, hence, enable compaction to be achieved by the known mechanisms of liquid-phase sintering. Additives of the type in question are oxides or oxide mixtures which, with the oxygen (expressed as $SiO_2$) always present in $Si_3N_4$ powders, form a stable silicate or oxynitride melt phase, which thoroughly wets $Si_3N_4$ and in which $Si_3N_4$ is soluble to a certain extent, at the temperatures typically applied for sintering. In addition to the oxides, nitrides, carbides, borides or silicides are also used, on the one hand to increase the nitrogen content of the liquid phase, which is generally thought to afford advantages in regard to the high-temperature properties, and on the other hand with a view to positively influencing the mechanical properties, preferably at room temperature, by incorporation of other crystalline secondary phases in the $Si_3N_4$ matrix material.

A common sintering additive is MgO both on its own and in combination with other additives or in the form of a compound (DE-A 2 855 859, DE-A 2 353 093, DE-A 2 302 438, DE-A 2 945 146). Hitherto, industrial significance has only been attributed to incorporation of the additives in powder form. Although incorporation or application by precipitation is mentioned in the literature, neither has hitherto resulted in demonstrable advantages in regard to material properties and/or process costs.

However, the use of powder-form MgO or MgO compounds also involves difficulties, above all where water has to be used with a view to obtaining moldable granules by spray drying or with a view to molding by slip casting.

The difficulties are as follows:

MgO hydrates and hydrolyses in aqueous suspensions during processing which, in the case of spray drying, leads to very hard granules which cannot be completely destroyed during press molding and, hence, form strength-limiting defects in the sintered parts.

In view of the high isoelectric point of MgO (pH>11), very high pH values of >11 have to be applied to avoid coagulation during the introduction of MgO into $Si_3N_4$-based slips due to different surface charge characteristics. This leads to numerous technical difficulties, including inter alia serious corrosion of plaster molds.

The hydrolysis of MgO leads to a considerable thickening of the slip, so that processing by slip casting is no longer possible.

In principle, the problem can be avoided by using non-aqueous suspension media, although this does result in very serious technical complications and requires elaborate processing measures. To overcome these problems, the MgO is often introduced in the form of a compound, for example Mg spinel, $MgAl_2O_4$ or cordierite 2 $MgO.2$ $Al_2O_3.5$ $SiO_2$, rather than as pure oxide. Apart from only gradual improvements in regard to the pH value, the isoelectric point and the tendency towards hydration, this process has the disadvantage that the ratio of MgO to residual MeO is very limited.

In addition, the strength level of the sintered materials obtained by this process does not always meet the relatively stringent demands which such materials are expected to satisfy.

Accordingly, the problem addressed by the present invention was to provide a material which would satisfy these requirements.

BRIEF DESCRIPTION OF THE INVENTION

Materials satisfying the requirements noted above are $Si_3Na_4$-based sintered compositions containing MgO and optionally other sintering additives, which after sintering, has a flexural strength level at room temperatures of $\geq 800$ MPa, measured by the four-point bending method with a span width of 40 mm for the lower pair of rollers and 20 mm for the upper pair of rollers in the flexure fixture, as described e.g. by G. Quinn, J.Am. Ceram. Sci 73 (1990) 2383–2384, and a Weibull modulus of >15. Such materials are produced by mixing MgO, any additional sintering additives and $Si_3N_4$ powder to form a mixture, calcining the mixture in an oxygen-free atmosphere to obtain a pre-synthesis mixture, and adding the pre-synthesis mixture to uncalcined $Si_3N_4$ powder which is then sintered.

DETAILED DESCRIPTION

These requirements are satisfied by an $Si_3N_4$-based sintered material containing MgO and, optionally, other sintering additives which is characterized in that, after sintering, it has a flexural strength level at room temperature of $\geq 800$ MPa (four-point method) and a Weibull modulus of $\geq 15$. A flexure strength level of 800 MPa (four-point method) corresponds to approximately 950 MPa (three-point method). The percentage MgO content is preferably from 0.5 to 10% by weight, based on the composition of the material. Particularly good properties are also shown by materials according to the invention which contain oxides, such as $Al_2O_3$, $SiO_2$, $Sc_2O_3$, $Y_2O_3$, $La_2O_3$ and other rare earth oxides, $TiO_2$, $ZrO_2$, $HfO_2$, and/or nitrides, such as AlN, BN, TiN, ZrN, HfN, and/or carbides, such as $Al_4C_3$, $B_4C$, SiC, TiC, ZrC, and/or borides, such as $TiB_2$, and/or silicides, such as $MoSi_2$, in quantities of 0.5 to 20% by weight, based on the composition of the material, as additional sintering additives. Particularly preferred additional sintering additives are one or more from the group of transition metal nitrides and/or AlN. AlN and/or TiN is/are particularly effective as additional sintering additives.

The present invention also relates to processes by which the sintered materials according to the invention can be produced.

One such process for the production of the sintered material according to the invention is characterized in that MgO and, optionally, additional sintering additives are mixed with an $Si_3N_4$ powder, the resulting mixture is calcined in an oxygen-free atmosphere and ground and the resulting pre-synthesis mixture is added to the remaining uncalcined $Si_3N_4$ powder and the resulting mixture is subsequently processed to the sintered material.

This process may be carried out, for example, by initially pregrinding the MgO, optionally with additional sintering additives, together with part of the $Si_3N_4$ either in an anhydrous organic liquid or under dry conditions. Suitable organic liquids are acetone, alcohols, hexane, gasoline or the like. The mixture thus formed is then calcined, optionally after necessary removal of the organic liquid and drying, for periods of preferably 30 minutes to 5 hours at temperatures of preferably 1,300° C. to 1,700° C. in vacuo, under nitrogen or any other inert gas. Surprisingly, there is a considerable reduction in the tendency towards hydrolysis in water after a pretreatment such as this.

In addition, the IEP (isoelectric point) of such calcined synthesis products in water is shifted to a value of around pH 7, so that good accordance with $Si_3N_4$ is obtained. This enables the slip to be prepared at a distinctly lower pH value, thus eliminating the technical difficulties mentioned above. Accordingly, a pre-synthesis such as this is a suitable way of preparing sintering mixtures containing MgO as additive (and optionally other additives) both for spray drying to press-moldable granules and also to slips for slip casting, eliminating the technical difficulties mentioned above.

It has also been found that, by adapting the calcination conditions, this effect occurs not only on addition of MgO alone to $Si_3N_4$ powders, instead the process may be correspondingly applied to mixtures of MgO with oxides, such as $Al_2O_3$, $SiO_2$, $Sc_2O_3$, $Y_2O_3$, $La_2O_3$ and other rare earth oxides, $TiO_2$, $ZrO_2$, $HfO_2$ and, in addition, to non-oxidic additives. Non-oxidic additives include carbides, such as SiC, $B_4C$, $Al_4C_3$, TiC, ZrC; nitrides, such as BN, AlN, TiN, ZrN, HfN; borides, such as $TiB_2$ for example, and even silicides, such as $MoSi_2$ for example. In all these cases, the tendency towards hydrolysis can be reduced by the pretreatment according to the invention to such an extent that stable slips can be prepared at pH values <10 and the formation of excessively hard agglomerates after spray drying is avoided.

Accordingly, a preferred embodiment of the process according to the invention is characterized in that the pre-synthesis mixture is added to the remaining $Si_3N_4$ powder in aqueous medium with subsequent spray drying.

Another equally advantageous embodiment is characterized in that the pre-synthesis mixture is added to the remaining $Si_3N_4$ powder in aqueous medium with subsequent slip casting.

Although EP-A 0 080 711 already describes a process in which both the $Si_3N_4$ starting powder and also a mixture of $Si_3N_4$ and sintering additives is pre-calcined in a non-oxidizing atmosphere at temperatures of 1,450° to 1,800° C. the object of this pretreatment is said to be to reduce the $SiO_2$ content of the $Si_3N_4$ powder so that good high-temperature properties are ultimately obtained. However, this pretreatment of the $Si_3N_4$ starting material alters the physical/chemical surface quality of the $Si_3N_4$ powder to such an extent that further processing in the form of aqueous suspensions is ruled out. The dispersibility of the $Si_3N_4$ powder is affected, the $Si_3N_4$ powder undergoing intensive hydration through the absence of $SiO_2$ passivation layer on the surface. Accordingly, mixtures pretreated in this way cannot be processed by the process according to the invention for the production of aqueous suspensions for slip casting or spray drying.

Accordingly, pre-synthesis products of the type in question may be added as a sintering additive to uncalcined, pure $Si_3N_4$ powders. By virtue of the fact that the pre-synthesis products already show a high degree of homogeneity in regard to the additives/$Si_3N_4$ distribution coupled with the fact that, where these pre-synthesis products are used, a relatively large addition has to be incorporated in a correspondingly reduced quantity of $Si_3N_4$ powder because the former already introduces part of the $Si_3N_4$ intended for the composition as a whole, a distinctly better overall homogeneity can clearly be obtained than in the case of mixtures prepared by addition of the pure starting components.

The percentage content of the pre-synthesis mixture may vary within relatively wide limits. Depending on the desired additive content in the sintered material and the selected ratio of additives to $Si_3N_4$ in the pre-synthesis product, the quantity added amounts to between 5 and 40% by weight, based on the mixture as a whole. The ratio by weight of additives to $Si_3N_4$ in the pre-synthesis product may be varied between 4:1 and 1:4 without in any way impairing effectiveness.

After sintering which leads to a high degree of compaction (sinter density ≧96% of the theoretical density), the mixtures prepared by the process according to the invention have a flexural strength at room temperature of >800 MPa (four-point method) and a Weibull modulus of ≧15, whereas comparison mixtures based on non-pre-synthesized additive mixtures, do not achieve this strength level on account of the above-described defects induced by hard agglomerates.

The following Examples are intended to illustrate the invention without limiting it in any way.

EXAMPLES

Example 1

Sintering mixtures containing 2.5% by weight MgO as sintering additive are compared. Mixture A according to the invention was prepared as follows:

grinding of a mixture of 50% by weight MgO and 50% by weight $Si_3N_4$ in isopropanol in a centrifugal ball mill, 10 h (minimum fineness 10 $m^2/g$); concentration by evaporation, sieve granulation, calcination in $N_2$ at 1,500° C., 1h; mortaring of the synthesis product; addition of 5% by weight of the synthesis product to 95% by weight of a sinterable $Si_3N_4$ powder having a specific surface of ≧15 $m_2/g$ and a total content of metallic impurities of ≦0.5% by weight; grinding in a centrifugal ball mill in $H_2O$ at pH 9 adjusted with $NH_4OH$ (and optionally addition of suitable dispersion and/or pressing aids) and at a solids content of 60% by weight, 10 h; spray drying, press molding to sheets of suitable dimensions for the production of strength test specimens measuring 3×4×45 mm.

Comparison mixture B was prepared by addition of a quantity corresponding to A of 2.5% by weight MgO in the form of MgO powder to 97.5% by weight of an identical $Si_3N_4$ powder. In the same way as mixture A, this mixture was ground in the form of an aqueous slip (60% solids) at pH 10 in a centrifugal ball mill, 10 h, and aftertreated in the same way as mixture A.

X-ray diffraction phase analysis of the synthesis product used in mixture A showed approx. 45% α-$Si_3N_4$, approx. 5% β-$Si_3N_4$, approx. 20% MgO, remainder unidentifiable small reflexes, in many cases close to e peaks of forsterite $Mg_2SiO_4$.

Determination of the electrokinetic mobility of the synthesis product used in A in a 0.001N $KNO_3$ solution showed a steady curve with an IEP at pH 7 (in contrast to pure MgO at pH ~13) in dependence upon the pH value (adjusted by addition of $HNO_3$/KOH).

Determination of the extractability of MgO from the synthesis product used in mixture A showed 0.96% MgO at pH 10, but 18% MgO in the case of pure MgO (used in mixture B) under identical conditions.

Accordingly, the synthesis product has a technically much more favorable IEP and a technically important improvement in its resistance to hydrolysis compared with pure MgO.

The samples prepared from mixtures A and B were sintered for 1 h at 1,850° C. under a gas pressure of 100 bar $N_2$ (final pressure) after incorporation in a powder mixture of 67.5% by weight $Si_3N_4$+2.5% by weight MgO+30% BN. The following results were obtained:

|  | ρ - s [g/cm³] | ρ - th [%] | σ - RT [MPa] | Weibull [—] |
|---|---|---|---|---|
| Mixture A, invention: | 3.18 | 99.5 | 825 | 18 |
| Mixture B, comparison: | 3.15 | 98.7 | 645 | 12 |

ρ - s = sintered density,
ρ - th = % of theoretical density,
σ - RT = flexural strength at room temperature,
Weibull = Weibull modulus Accordingly, a distinct increase in the strength level is achieved with material A according to the invention with less scattering of the measured data, as characterized by the considerably better Weibull modulus, which is attributable to the greater homogeneity of material A.

Example 2

The following mixtures are compared, being prepared in exactly the same way as described in Example 1:

| Mixture | Additives [% by weight] | Preliminary reaction: % Contents | Conditions |
|---|---|---|---|
| C | 1.4 MgO + 3.6 $Al_2O_3$ | 50% additive mixture 50% $Si_3N_4$ | 1,500° C. 1 h $N_2$ |
| D | 5 $MgAl_2O_4$ | — | — |
| E | 2 MgO + 3 AlN | 50% additive mixture 50% $Si_3N_4$ | 1,450° C. 1 h $N_2$ |
| F | 1 MgO + 3 AlN | — | — |

Analysis of the synthesis products in comparison with the pure substances produced the following results:

| Mixture | X-ray diffraction phase analysis (in addition to $Si_3N_4$) | pH of IEP | Extractability (pH = 10) |
|---|---|---|---|
| C | Traces $MgAl_2O_4$ remainder unidentifiable | 7.5 | 0.05% Mg 150 ppm Al |
| D | — | Two-peak distribution; min. = 11 | 0.4% Mg 0.4% Al |
| E | Small unidentifiable reflexes | 7 | 0.07% Mg |
| F | — | Multiple-peak distribution | 130 ppm Al 11.0% Mg 1.4% Al |

As in the first Example, samples were prepared from mixtures C to F and were sintered in a powder bed under the following conditions: 1,820° C./2 h/1 bar $N_2$. The following results were obtained:

|  | ρ - s [g/cm³] | ρ - th [%] | σ - RT [MPa] | Weibull [—] |
|---|---|---|---|---|
| Mixture C, invention: | 3.17 | 99.5 | 914 | 22 |
| Comparison mixture (to C) D: | 3.12 | 97.5 | 645 | 9 |
| Mixture E, invention: | 3.17 | 99.0 | 870 | 18 |
| Comparison mixture (to E) F: | 3.14 | 98.1 | 729 | 13 |

Accordingly, mixtures C and E according to the invention again achieve considerably better properties than the respective comparison mixtures.

Example 3

Mixtures containing up to three different oxide, nitride or carbide additives are compared in this Example.

| Mixture | Additives [% by weight] | Preliminary reaction: % Contents | Conditions |
|---|---|---|---|
| G | 1 MgO + 6 $Y_2O_3$ + 2 $Al_2O_3$ | 50 additive mixture + 50 $Si_3N_4$ | 1,550° C., 1 h, $N_2$ |
| H | 1 MgO + 6 $Y_2O_3$ + 2 $Al_2O_3$ | — | — |
| I | 4 MgO + 6 $Y_2O_3$ + 1 $ZrO_2$ | 50 additive mixture + 50 $Si_3N_4$ | 1,450° C., 1 h, $N_2$ |
| J | 4 MgO + 6 $Y_2O_3$ + 1 $ZrO_2$ | — | — |
| K | 1 MgO + 4 $ZrO_2$ + 6 $Al_2O_3$ | 30 additive mixture + 70 $Si_3N_4$ | 1,500° C., 1 h, $N_2$ |
| L | 1 MgO + 4 $ZrO_2$ + 6 $Al_2O_3$ | — | — |
| M | 1 MgO + 1.5 AlN + 2.5 TiN | 50 additive mixture + 50 $Si_3N_4$ | 1,500° C., 1 h, $N_2$ |
| N | 1 MgO + 1.5 AlN + 2.5 TiN | — | — |

The following Table shows the extractability at pH 10 and the pH-value of the IEP of the pure substances used, determined as described in Example 1.

| Raw material | Extractability (pH = 10) | pH of IEP |
|---|---|---|
| MgO | Mg: 11% by weight | ~13 |
| $Al_2O_3$ | Al: 200 ppm | 10 |
| $Y_2O_3$ | Y: 1.4% by weight | 11.5 |
| $ZrO_2$ | Zr: 150 ppm | 10.5 |
| AlN | Al: 1.4% by weight | 9 |
| TiN | Ti: 120 ppm | 4 |

The extractability and IEP values of the synthesis products used in mixtures G, I, K and M are shown in the following Table. X-ray diffraction phase analysis has not been included among the results because, apart from slightly varying α/β-$Si_3N_4$ contents and a residue of TiN in the case of (M), only unidentifiable reflexes were observed.

| Synthesis product and composition [% by weight] | Extractability (pH = 10) [ppm] | | pH-IEP |
|---|---|---|---|
| G: 50 $Si_3N_4$ + 5.6 MgO + 33.3 $Y_2O_3$ + 11.1 $Al_2O_3$ | Mg: 300<br>Al: 120 | Y: 250 | 7.5 |
| I: 50 $Si_3N_4$ + 18.2 MgO + 27.3 $Y_2O_3$ + 4.2 $ZrO_2$ | Mg: 400<br>Zr: 50 | Y: 200 | 8 |
| K: 70 $Si_3N_4$ + 2.7 MgO + 10.9 $ZrO_2$ + 16.4 $Al_2O_3$ | Mg: 120<br>Al: 150 | Zr: 100 | 7.5 |
| M: 50 $Si_3N_4$ + 10 MgO + 15 AlN + 25 TiN | Mg: 400<br>Ti: <1 | Al: 130 | 7 |

These two Tables show that the tendency of the additive components towards hydrolysis is considerably reduced by the pre-synthesis. In addition, the mixtures show a steady electrokinetic mobility trend as a function of the pH value with isoelectric points between 7 and 8. By contrast, comparison mixtures show non-steady, generally multiple-peak trends with no clear IEP, which is also reflected in slips of extremely high viscosity which, in addition, show a marked time-dependence of the viscosity.

The results of sintering tests and strength measurements are shown in the following Table:

|  | Sintering mixture Additive [% by weight] | Sintering Conditions | | | ρ - s [g/cm³] | ρ - th [%] | σ - RT [MPa] | Weibull [—] |
|---|---|---|---|---|---|---|---|---|
|  |  | T [°C.] | t [min] | p [barN₂] |  |  |  |  |
| G (Invention) | 18 Add. - "G" | 1,800 | 120 | 1 | 3.25 | >99 | 875 | 21 |
| H (Comparison) | 1 MgO + 6 $Y_2O_3$ + 2 $Al_2O_3$ | 1,800 | 120 | 1 | 3.21 | ~97.5 | 719 | 14 |
| I (Invention) | 22 Add. - "I" | 1,820 | 180 | 1 | 3.24 | ~99 | 848 | 17 |
| J (Comparison) | 4 MgO + 6 $Y_2O_3$ + 1 $ZrO_2$ | 1,820 | 180 | 1 | 3.20 | ~97.5 | 674 | 13 |
| K (Invention) | 36.7 Add. - "K" | 1,800 | 120 | 1 | 3.23 | ~98 | 845 | 16 |
| L (Comparison) | 1 MgO + 4 $ZrO_2$ + 6 $Al_2O_3$ | 1,800 | 120 | 1 | 3.18 | ~96.5 | 707 | 11 |
|  |  | Two-stage sintering | | |  |  |  |  |
| M (Invention) | 10 Add. - "M" | 1800+ | 60+ | 1+ | 3.24 | >99 | 852 | 17 |
| N (Comparison) | 1 MgO + 1.5 AlN + 2.5 TiN | 1,450 | 60 | 100 | 3.20 | ~98 | 685 | 11 |

These Examples also show that it is possible by the process of pre-synthesizing the additive mixtures to obtain materials which, according to the invention, show distinctly better properties than comparison materials produced by the conventional process of mixing the pure starting materials.

What is claimed is:

1. A process for the production of $Si_3N_4$-based sintered compositions containing MgO and optionally other sintering additives, which after sintering, have a flexural strength level at room temperature of ≧800 MPa, measured by the four-point bending method, and a Weibull modulus of >15, which process comprises mixing any sintering additives and $Si_3N_4$ powder to form a mixture, calcining the mixture in an oxygen-free atmosphere and then grinding the calcined mixture to obtain a pre-synthesis mixture, and adding the pre-synthesis mixture to uncalcined $Si_3N_4$ in an aqueous medium, which mixture is then sintered.

2. A process as claimed in claim 1 wherein the pre-synthesis mixture is added to the uncalcined $Si_3N_4$ powder with subsequent spray drying.

3. A process claimed in claim 1 wherein the pre-synthesis mixture is added to the uncalcined $Si_3N_4$ powder with subsequent slip casting.

4. A process as claimed in claim 1 wherein the pre-synthesis mixture is from 5 to 40% by weight of the composition.

5. A process as claimed in claim 1 wherein the ratio by weight of $Si_3N_4$ to sintering additives in the pre-synthesis mixture is from 4:1 to 1:4.

6. A process for producing $Si_3N_4$-based sintered compositions containing MgO and optionally other sintering additives which comprises mixing any sintering additives and $Si_3N_4$ powder to form a mixture, calcining the mixture in an oxygen-free atmosphere and then grinding the calcined mixture to obtain a pre-synthesis mixture, and adding the pre-synthesis mixture to uncalcined $Si_3N_4$ in an aqueous medium, which mixture is then sintered.

7. A process as claimed in claim 6, wherein the pre-synthesis mixture is added to the uncalcined $Si_3N_4$ powder with subsequent spray drying.

8. A process as claimed in claim 6, wherein the pre-synthesis mixture is added to the uncalcined $Si_3N_4$ powder with subsequent slip casting.

9. A process as claimed in claim 6 wherein the pre-synthesis mixture is from 5 to 40% by weight of the composition.

10. A process as claimed in claim 6 wherein the ratio by weight of $Si_3N_4$ to sintering additives in the pre-synthesis mixture is from 4:1 to 1:4.

* * * * *